United States Patent
Liu et al.

(10) Patent No.: US 11,425,724 B2
(45) Date of Patent: Aug. 23, 2022

(54) CARRIER AGGREGATION FOR NARROWBAND INTERNET OF THINGS USER EQUIPMENT

(71) Applicant: QUALCOMM Incorporated, San Diego, CA (US)

(72) Inventors: Le Liu, Fremont, CA (US); Alberto Rico Alvarino, San Diego, CA (US); Raghavendra Shyam Ananda, Hyderabad (IN); Srikanth Menon, Hyderabad (IN); Murali Menon, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 16/909,412

(22) Filed: Jun. 23, 2020

(65) Prior Publication Data

US 2021/0014851 A1    Jan. 14, 2021

(30) Foreign Application Priority Data

Jul. 12, 2019    (IN) .............................. 201941028070

(51) Int. Cl.
*H04W 72/04*    (2009.01)
*H04L 1/18*    (2006.01)

(52) U.S. Cl.
CPC ......... *H04W 72/048* (2013.01); *H04L 1/1812* (2013.01); *H04W 72/042* (2013.01)

(58) Field of Classification Search
CPC .. H04L 1/1812; H04W 72/042; H04W 72/048
See application file for complete search history.

(56) References Cited

U.S. PATENT DOCUMENTS

| 9,271,290 | B2 * | 2/2016 | Pelletier | H04W 72/0453 |
| 10,143,016 | B2 * | 11/2018 | Marinier | H04W 76/28 |
| 10,218,406 | B2 * | 2/2019 | Liu | H04B 7/24 |

(Continued)

FOREIGN PATENT DOCUMENTS

| AU | 2017321099 A1 * | 2/2019 | ............. H04B 1/005 |
| AU | 2017321099 B2 * | 11/2021 | ............. H04B 1/005 |

(Continued)

OTHER PUBLICATIONS

International Search Report and Written Opinion—PCT/US2020/039291—ISA/EPO—dated Sep. 18, 2020.

*Primary Examiner* — Eric Nowlin
(74) *Attorney, Agent, or Firm* — Harrity & Harrity, LLP

(57) ABSTRACT

Various aspects of the present disclosure generally relate to wireless communication. In some aspects, a user equipment (UE) may signal, to a base station, a capability of the UE relating to carrier aggregation for a particular category or class of the UE, such as for narrowband Internet of Things (NB-IoT) UEs. The UE may receive, from the base station, a configuration for carrier aggregation for the particular category or class of the UE based at least in part on the capability of the UE relating to carrier aggregation for the particular category or class of the UE. The UE may communicate with the base station using carrier aggregation based at least in part on the configuration for carrier aggregation for the particular category or class of the UE. Numerous other aspects are provided.

40 Claims, 11 Drawing Sheets

(56) References Cited

U.S. PATENT DOCUMENTS

| | | | |
|---|---|---|---|
| 10,425,265 B2 * | 9/2019 | Hwang | H04L 27/2602 |
| 10,461,797 B2 * | 10/2019 | Liu | H04B 1/005 |
| 10,560,944 B2 * | 2/2020 | Marinier | H04W 88/06 |
| 10,582,377 B2 * | 3/2020 | Takahashi | H04L 5/0092 |
| 10,834,774 B1 * | 11/2020 | Haberman | H04W 76/38 |
| 10,917,214 B2 * | 2/2021 | Hwang | H04W 4/00 |
| 10,986,622 B2 * | 4/2021 | Zhang | H04B 7/088 |
| 11,160,086 B2 * | 10/2021 | Jamadagni | H04W 74/0833 |
| 11,172,371 B2 * | 11/2021 | Sesia | H04L 5/001 |
| 2010/0130218 A1 * | 5/2010 | Zhang | H04W 74/0833 455/450 |
| 2010/0215011 A1 * | 8/2010 | Pan | H04W 72/0406 370/329 |
| 2010/0271939 A1 * | 10/2010 | Gholmieh | H04L 5/0096 370/228 |
| 2010/0303011 A1 * | 12/2010 | Pan | H04L 5/0091 370/328 |
| 2010/0304689 A1 * | 12/2010 | McBeath | H04W 72/0406 455/68 |
| 2010/0318871 A1 * | 12/2010 | Lee | H04L 1/1816 714/749 |
| 2012/0140743 A1 * | 6/2012 | Pelletier | H04W 76/15 370/335 |
| 2015/0245307 A1 * | 8/2015 | Chen | H04L 5/001 370/336 |
| 2016/0066364 A1 * | 3/2016 | Marinier | H04W 72/0453 370/329 |
| 2016/0112965 A1 * | 4/2016 | Damnjanovic | H04W 52/34 455/1 |
| 2016/0135187 A1 * | 5/2016 | Cui | H04W 72/0453 370/329 |
| 2016/0255594 A1 * | 9/2016 | Vajapeyam | H04W 52/346 455/522 |
| 2016/0301513 A1 * | 10/2016 | He | H04L 5/0098 |
| 2017/0230780 A1 * | 8/2017 | Chincholi | H04L 1/0036 |
| 2017/0238284 A1 * | 8/2017 | Tseng | H04W 72/042 370/329 |
| 2018/0020452 A1 * | 1/2018 | Yerramalli | H04L 5/0098 |
| 2018/0069589 A1 * | 3/2018 | Liu | H04L 27/0006 |
| 2018/0076872 A1 * | 3/2018 | Li | H04L 5/0094 |
| 2018/0220295 A1 * | 8/2018 | Takahashi | H04W 8/24 |
| 2018/0242179 A1 * | 8/2018 | Rathonyi | H04W 72/048 |
| 2018/0248668 A1 * | 8/2018 | Hwang | H04L 5/0094 |
| 2019/0045372 A1 * | 2/2019 | Niu | H04W 16/14 |
| 2019/0059059 A1 * | 2/2019 | Marinier | H04W 88/06 |
| 2019/0149185 A1 * | 5/2019 | Liu | H04L 5/001 375/130 |
| 2019/0174449 A1 * | 6/2019 | Shan | H04W 76/11 |
| 2019/0174466 A1 * | 6/2019 | Zhang | H04L 5/0048 |
| 2019/0181995 A1 * | 6/2019 | Liu | H04W 72/0446 |
| 2019/0215011 A1 * | 7/2019 | Nammi | H03M 13/13 |
| 2019/0261335 A1 * | 8/2019 | Peng | H04L 1/0089 |
| 2019/0268949 A1 * | 8/2019 | Menon | H04B 17/327 |
| 2019/0281588 A1 * | 9/2019 | Zhang | H04W 52/08 |
| 2019/0305899 A1 * | 10/2019 | Rico Alvarino | H04L 5/0053 |
| 2019/0319764 A1 * | 10/2019 | Nader | H04L 5/0091 |
| 2019/0342852 A1 * | 11/2019 | Marco | H04W 72/0453 |
| 2019/0349775 A1 * | 11/2019 | Sui | H04W 16/14 |
| 2019/0357175 A1 * | 11/2019 | Hoglund | H04W 76/27 |
| 2019/0363857 A1 * | 11/2019 | Hwang | H04L 1/1854 |
| 2019/0364464 A1 * | 11/2019 | Shaikh | H04L 12/1407 |
| 2020/0154393 A1 * | 5/2020 | Hoglund | H04W 68/12 |
| 2020/0154436 A1 * | 5/2020 | Marinier | H04W 88/06 |
| 2020/0204318 A1 * | 6/2020 | Thangarasa | H04W 74/0833 |
| 2020/0252809 A1 * | 8/2020 | Patil | H04W 52/36 |
| 2020/0280337 A1 * | 9/2020 | Yi | H04L 5/0098 |
| 2020/0296576 A1 * | 9/2020 | Ouchi | H04W 72/0453 |
| 2020/0351885 A1 * | 11/2020 | Jamadagni | H04W 28/00 |
| 2021/0014851 A1 * | 1/2021 | Liu | H04L 5/001 |
| 2021/0058893 A1 * | 2/2021 | Sha | H04W 52/0235 |
| 2021/0076438 A1 * | 3/2021 | Lee | H04W 76/15 |
| 2021/0120390 A1 * | 4/2021 | Rico Alvarino | H04L 5/0091 |
| 2021/0127375 A1 * | 4/2021 | Hoglund | H04W 72/044 |
| 2021/0144560 A1 * | 5/2021 | Sesia | H04W 72/0413 |
| 2021/0160911 A1 * | 5/2021 | Park | H04L 5/0053 |
| 2021/0377108 A1 * | 12/2021 | Cho | H04L 41/0803 |

FOREIGN PATENT DOCUMENTS

| | | | | |
|---|---|---|---|---|
| CA | 3032500 A1 * | 3/2018 | | H04B 1/005 |
| CN | 102611994 A * | 7/2012 | | |
| CN | 103238368 A * | 8/2013 | | H04L 5/001 |
| CN | 102611994 B * | 12/2015 | | |
| CN | 103238368 B * | 2/2017 | | H04L 5/001 |
| CN | 107995658 A * | 5/2018 | | |
| CN | 108111570 A * | 6/2018 | | |
| CN | 109644113 A * | 4/2019 | | H04B 1/005 |
| CN | 111052789 A * | 4/2020 | | H04W 28/00 |
| CN | 109644113 B * | 1/2022 | | H04B 1/005 |
| CN | 114142888 A * | 3/2022 | | H04B 1/005 |
| CN | 114175841 A * | 3/2022 | | |
| EP | 3247061 A1 * | 11/2017 | | H04W 72/042 |
| EP | 3247061 A1 | 11/2017 | | |
| EP | 2647259 B1 * | 1/2018 | | H04L 5/001 |
| EP | 3319395 A1 * | 5/2018 | | H04L 5/001 |
| EP | 3247061 A4 * | 10/2018 | | H04L 5/0053 |
| EP | 3453207 A1 * | 3/2019 | | H04W 48/12 |
| EP | 3461026 B1 * | 7/2020 | | H04B 7/0617 |
| EP | 3780835 A1 * | 2/2021 | | H04L 5/0053 |
| JP | 2014504474 A * | 2/2014 | | H04L 5/001 |
| JP | 5977251 B2 * | 8/2016 | | H04L 5/001 |
| JP | 2016195458 A * | 11/2016 | | H04L 5/001 |
| JP | 2019532558 A * | 6/2017 | | |
| JP | 2020528252 A * | 8/2018 | | |
| JP | 6449818 B2 * | 1/2019 | | H04L 5/001 |
| JP | 2019068452 A * | 4/2019 | | H04L 5/001 |
| JP | 6633728 B2 * | 1/2020 | | H04L 5/001 |
| JP | 2020058056 A * | 4/2020 | | H04L 5/001 |
| JP | 6982714 B2 * | 12/2021 | | H04W 28/00 |
| KR | 20130143098 A * | 12/2013 | | H04L 5/001 |
| KR | 20180003635 A * | 1/2018 | | H04L 5/001 |
| KR | 20200044801 A * | 8/2018 | | |
| KR | 20180117214 A * | 10/2018 | | H04L 5/001 |
| KR | 102258940 B1 * | 6/2021 | | H04L 5/001 |
| KR | 20210065200 A * | 6/2021 | | H04L 5/001 |
| TW | 201637507 A * | 10/2016 | | H04L 5/001 |
| TW | I740973 B * | 6/2017 | | |
| WO | WO-2012074878 A2 * | 6/2012 | | H04L 5/001 |
| WO | WO-2017192624 A1 * | 11/2017 | | H04W 48/16 |
| WO | WO-2018044388 A1 * | 3/2018 | | H04B 1/005 |
| WO | WO-2019043638 A1 * | 3/2019 | | H04W 28/00 |
| WO | WO-2019145494 A1 * | 8/2019 | | H04W 72/1289 |
| WO | WO-2021035447 A1 * | 3/2021 | | |

* cited by examiner

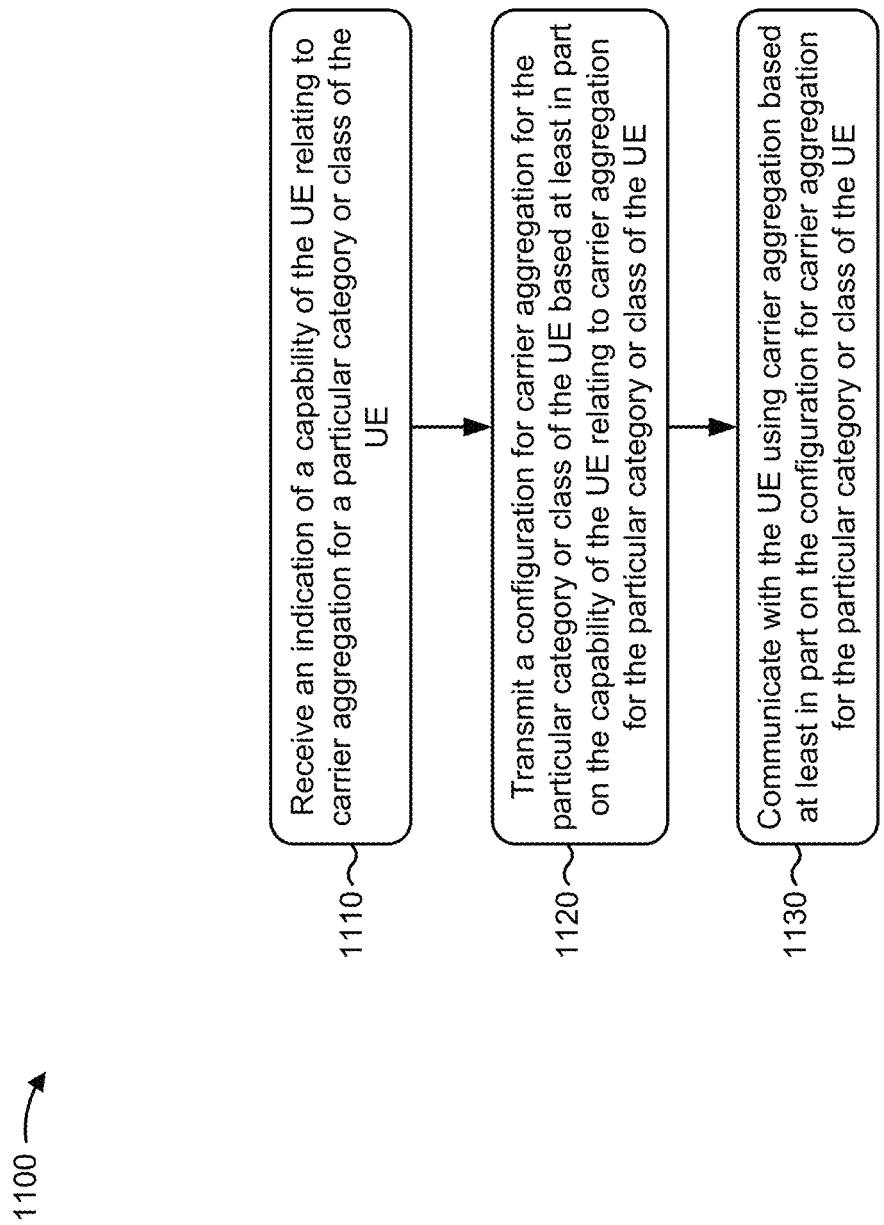

CARRIER AGGREGATION FOR NARROWBAND INTERNET OF THINGS USER EQUIPMENT

CROSS-REFERENCE TO RELATED APPLICATION

This patent application claims priority to India Patent Application No. 201941028070, filed on Jul. 12, 2019, entitled "CARRIER AGGREGATION FOR NARROWBAND INTERNET OF THINGS USER EQUIPMENT," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for carrier aggregation for narrowband Internet of Things (NB-IoT) user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include signaling, to a base station, a capability of the UE relating to carrier aggregation for a particular category or class of the UE; receiving, from the base station, a configuration for carrier aggregation for the particular category or class of the UE based at least in part on the capability of the UE relating to carrier aggregation for the particular category or class of the UE; and communicating with the base station using carrier aggregation based at least in part on the configuration for carrier aggregation for the particular category or class of the UE.

In some aspects, a UE for wireless communication may include memory and one or more processors operatively coupled to the memory. The memory and the one or more processors may be configured to signal, to a base station, a capability of the UE relating to carrier aggregation for a particular category or class of the UE; receive, from the base station, a configuration for carrier aggregation for the particular category or class of the UE based at least in part on the capability of the UE relating to carrier aggregation for the particular category or class of the UE; and communicate with the base station using carrier aggregation based at least in part on the configuration for carrier aggregation for the particular category or class of the UE.

In some aspects, a non-transitory computer-readable medium may store one or more instructions for wireless communication. The one or more instructions, when executed by one or more processors of a UE, may cause the one or more processors to: signal, to a base station, a capability of the UE relating to carrier aggregation for a particular category or class of the UE; receive, from the base station, a configuration for carrier aggregation for the particular category or class of the UE based at least in part on the capability of the UE relating to carrier aggregation for the particular category or class of the UE; and communicate with the base station using carrier aggregation based at least in part on the configuration for carrier aggregation for the particular category or class of the UE.

In some aspects, a UE (e.g., an apparatus) for wireless communication may include means for signaling, to a base station, a capability of the UE relating to carrier aggregation for a particular category or class of the UE; means for receiving, from the base station, a configuration for carrier aggregation for the particular category or class of the UE based at least in part on the capability of the UE relating to carrier aggregation for the particular category or class of the UE; and means for communicating with the base station using carrier aggregation based at least in part on the configuration for carrier aggregation for the particular category or class of the UE.

In some aspects, a method of wireless communication, performed by a base station, may include receiving, from a UE, an indication of a capability of the UE relating to carrier aggregation for a particular category or class of the UE; transmitting, to the UE, a configuration for carrier aggregation for the particular category or class of the UE based at least in part on the capability of the UE relating to carrier aggregation for the particular category or class of the UE; and communicating with the UE using carrier aggregation based at least in part on the configuration for carrier aggregation for the particular category or class of the UE.

In some aspects, a base station for wireless communication may include memory and one or more processors operatively coupled to the memory. The memory and the one or more processors may be configured to receive, from a UE, an indication of a capability of the UE relating to carrier aggregation for a particular category or class of the UE Es; transmit, to the UE, a configuration for carrier aggregation for the particular category or class of the UE based at least in part on the capability of the UE relating to carrier aggregation for the particular category or class of the UE; and communicate with the UE using carrier aggregation based at least in part on the configuration for carrier aggregation for the particular category or class of the UE.

In some aspects, a non-transitory computer-readable medium may store one or more instructions for wireless communication. The one or more instructions, when executed by one or more processors of a base station, may cause the one or more processors to: receive, from a UE, an indication of a capability of the UE relating to carrier aggregation for a particular category or class of the UE; transmit, to the UE, a configuration for carrier aggregation for the particular category or class of the UE based at least in part on the capability of the UE relating to carrier aggregation for the particular category or class of the UE; and communicate with the UE using carrier aggregation based at least in part on the configuration for carrier aggregation for the particular category or class of the UE.

In some aspects, a base station (e.g., an apparatus) for wireless communication may include means for receiving, from a UE, an indication of a capability of the UE relating to carrier aggregation for a particular category or class of the UE; means for transmitting, to the UE, a configuration for carrier aggregation for the particular category or class of the UE based at least in part on the capability of the UE relating to carrier aggregation for the particular category or class of the UE; and means for communicating with the UE using carrier aggregation based at least in part on the configuration for carrier aggregation for the particular category or class of the UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10 and 11 are diagrams illustrating example processes relating to carrier aggregation for an NB-IoT UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
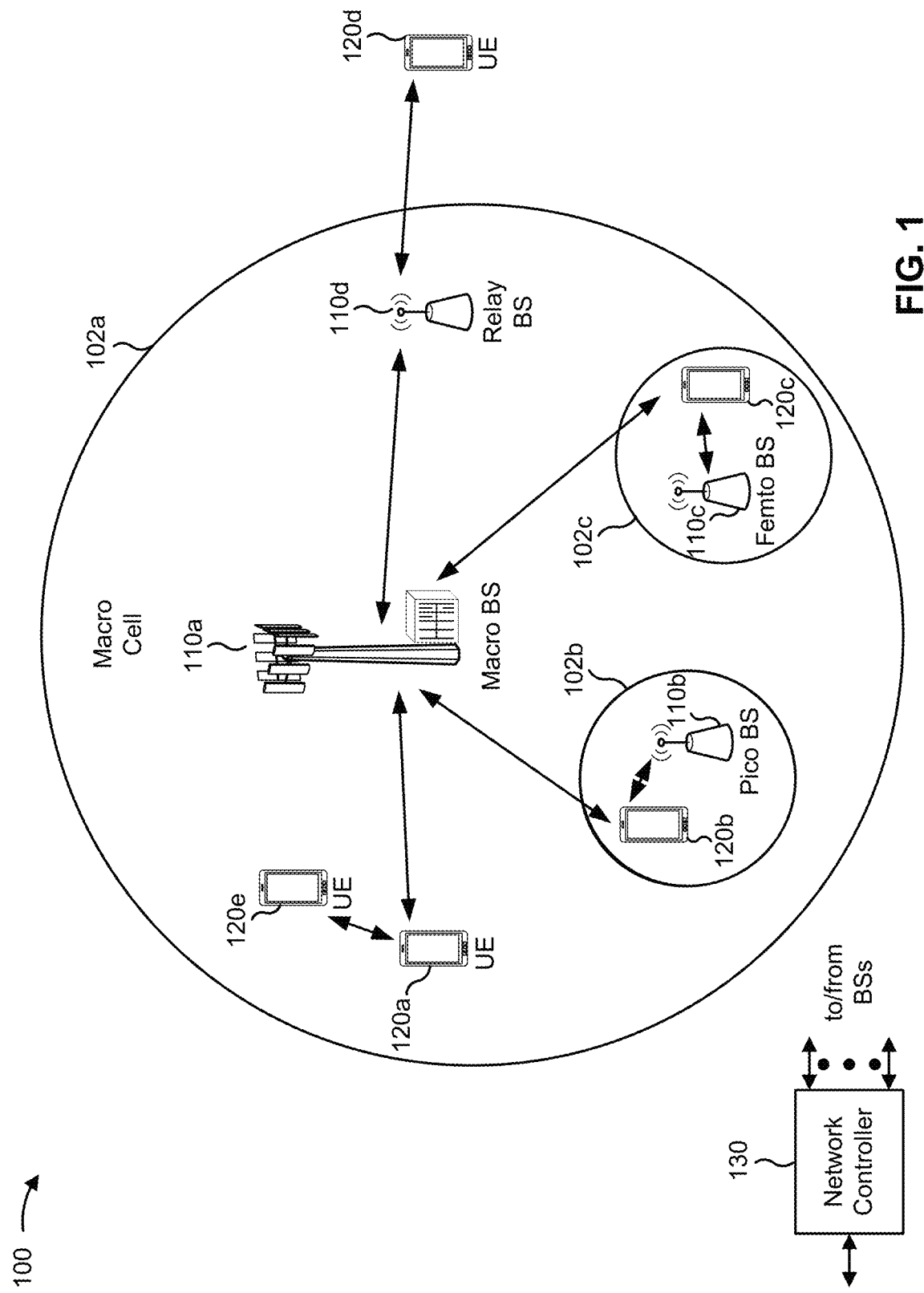
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as narrowband Internet of Things (NB-IoT) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
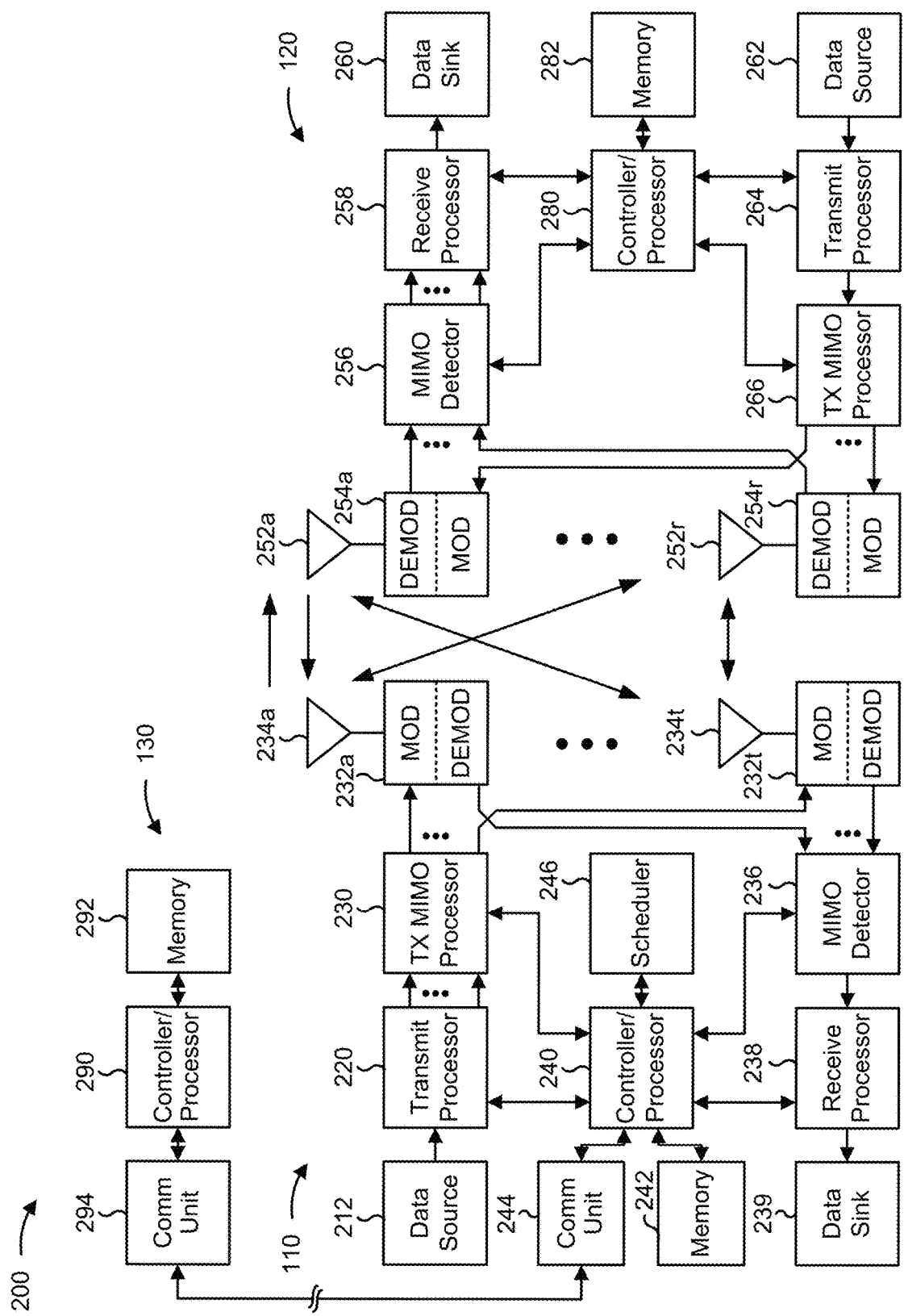
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with carrier aggregation for a narrowband Internet of Things (NB-IoT) UE, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 1000 of FIG. 10, process 1100 of FIG. 11, and/or other processes as described herein. A scheduler 246 may schedule UEs for data transmission on the downlink and/or uplink.

In some aspects, UE 120 may include means for signaling, to a base station, a capability of the UE relating to carrier aggregation for a particular category or class of the UE (e.g., an NB-IoT category or class); means for receiving, from the base station, a configuration for carrier aggregation for the particular category or class of the UE based at least in part on the capability of the UE relating to carrier aggregation for the particular category or class of the UE; means for communicating with the base station using carrier aggregation based at least in part on the configuration for carrier aggregation for the particular category or class of the UE; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an indication of a capability of the UE relating to carrier aggregation for a particular category or class of the UE (e.g., an NB-IoT category or class); means for transmitting, to the UE, a configuration for carrier aggregation for the particular category or class of the UE based at least in part on the capability of the UE relating to carrier aggregation for the particular category or class of the UE; means for communicating with the UE using carrier aggregation based at least in part on the configuration of carrier aggregation for the particular category or class of the UE; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
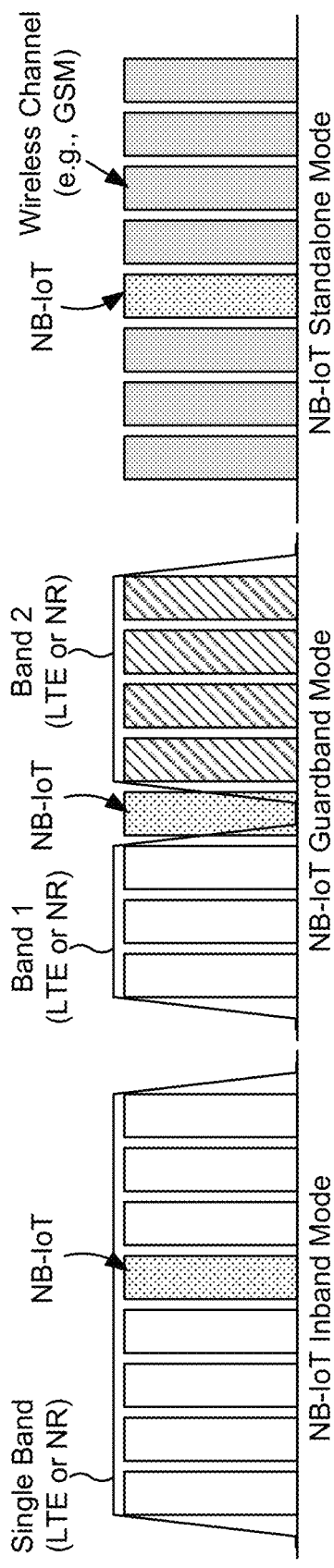
FIG. 3 is a diagram illustrating examples of UE capabilities for NB-IoT communications, in accordance with various aspects of the present disclosure.

FIG. 3 is a diagram illustrating examples 300 of UE capabilities for NB-IoT communications, in accordance with various aspects of the present disclosure.

An NB-IoT UE (e.g., a UE 120) may refer to a category or class of UEs that utilize a low power wide area network (LPWAN) radio access technology to enable a wide range of cellular devices and services. The NB-IoT radio technology standard focuses on coverage in indoor and/or remote (e.g., rural) locations, low cost, long battery life, and high connection density. In NB-IoT, bandwidth for communications of or with an NB-IoT UE is limited to a single narrowband of 200 kilohertz (kHz). NB-IoT may use OFDM for downlink communications and SC-FDMA for uplink communications. Although some techniques are described herein in connection with NB-IoT UEs, these techniques may apply to other categories or classes of UEs, such as reduced capability UEs, low tier UEs, and/or the like.

As shown in FIG. 3, an NB-IoT UE may operate in an inband mode, a guardband mode, or a standalone mode. In the inband mode, the NB-IoT UE operates within a band reserved for LTE and/or NR communications. In the inband mode, a base station 110 can allocate resource block(s) of the band to the NB-IoT UE for NB-IoT communications, as shown. In the guardband mode, the NB-IoT UE operates in a guardband between two different bands reserved for LTE and/or NR communications. In the guardband mode, a base station 110 can allocate resource block(s) of the guardband to the NB-IoT UE for NB-IoT communications, as shown. In the standalone mode, the NB-IoT operates outside of spectrum reserved for LTE and/or NR, such as by using a band previously used for GSM communications.

An NB-IoT UE may communicate using an anchor carrier and/or a non-anchor carrier. An anchor carrier may carry a physical broadcast channel (PBCH), system information (e.g., a system information block (SIB), such as SIB1), a narrowband primary synchronization signal (NPSS), a narrowband secondary synchronization signal (NSSS), and/or the like. For example, an anchor carrier may carry the PBCH in subframe 0, may carry system information in subframe 4, may carry the NPSS in subframe 5, and may carry the NSSS in subframe 9 in odd radio frames, as shown. The remaining subframes of an anchor carrier may be used for downlink data (e.g., on a narrowband physical downlink shared channel (NPDSCH)), uplink data (e.g., on a narrowband physical uplink shared channel (NPUSCH)), downlink control (e.g., on a narrowband physical downlink control channel (NPDCCH)), uplink control (e.g., on a narrowband physical uplink control channel (NPUCCH)), narrowband reference signals (NRS), and/or the like. A non-anchor carrier may carry only downlink data, uplink data, downlink control, uplink control, and/or NRS, and may not carry the PBCH, system information, NPSS, and/or NSSS.

In NB-IoT, throughput for an NB-IoT UE may be limited due to the use of a single carrier for communications, which may be limited to a bandwidth of a single physical resource block (PRB) (e.g., 200 kHz). Some techniques and apparatuses described herein permit throughput for an NB-IoT UE to be increased using carrier aggregation for NB-IoT. Due to the design of NB-IoT, deploying carrier aggregation presents challenges as compared to legacy LTE systems, as described in more detail elsewhere herein.

As indicated above, FIG. 3 is provided as an example. Other examples may differ from what is described with regard to FIG. 3.

Figure 4:
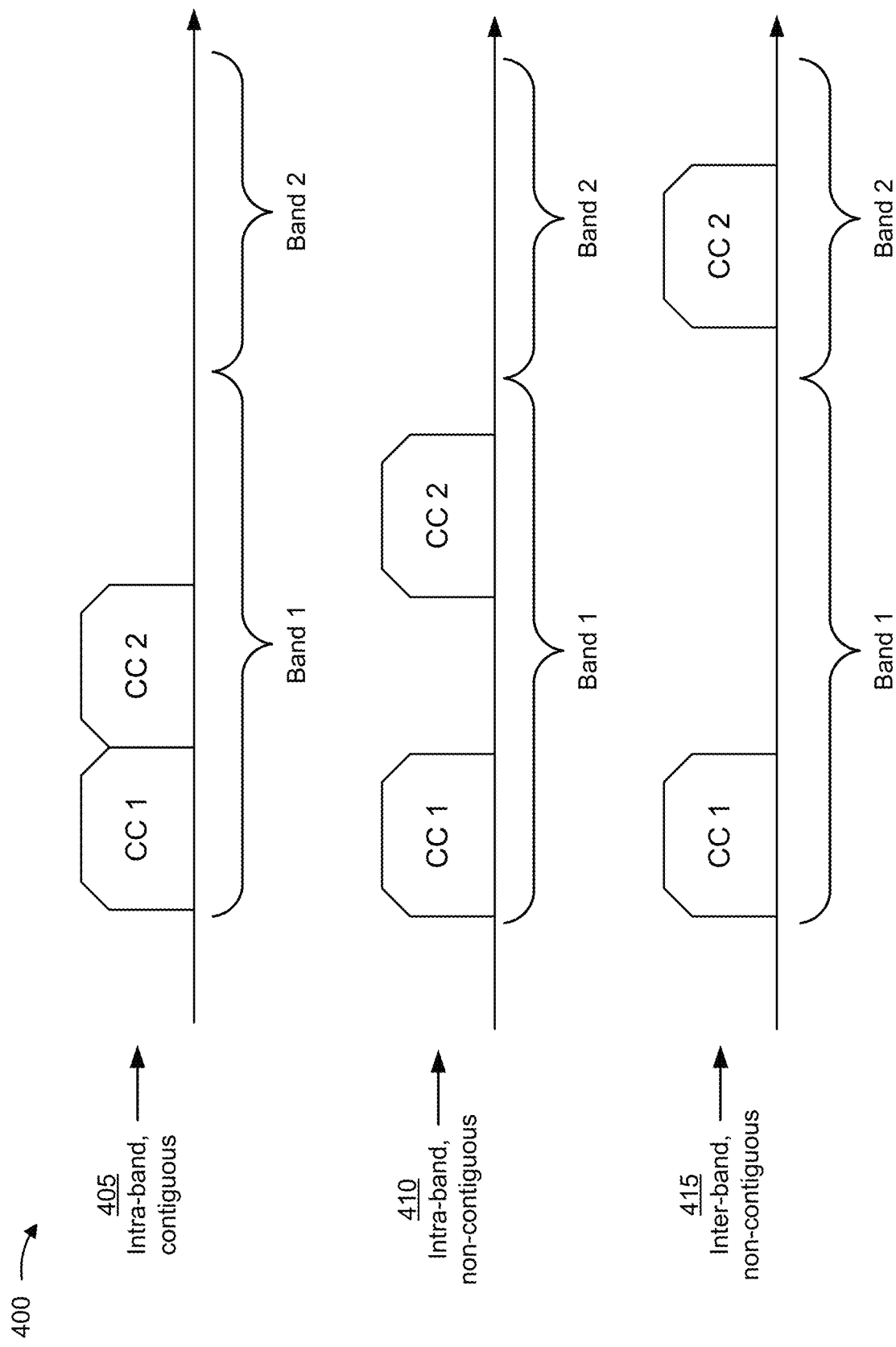
FIG. 4 is a diagram illustrating examples of carrier aggregation, in accordance with various aspects of the present disclosure.

FIG. 4 is a diagram illustrating examples 400 of carrier aggregation, in accordance with various aspects of the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, downlink control information (DCI), and/or the like.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

As indicated above, FIG. 4 is provided as an example. Other examples may differ from what is described with regard to FIG. 4.

Figure 5:
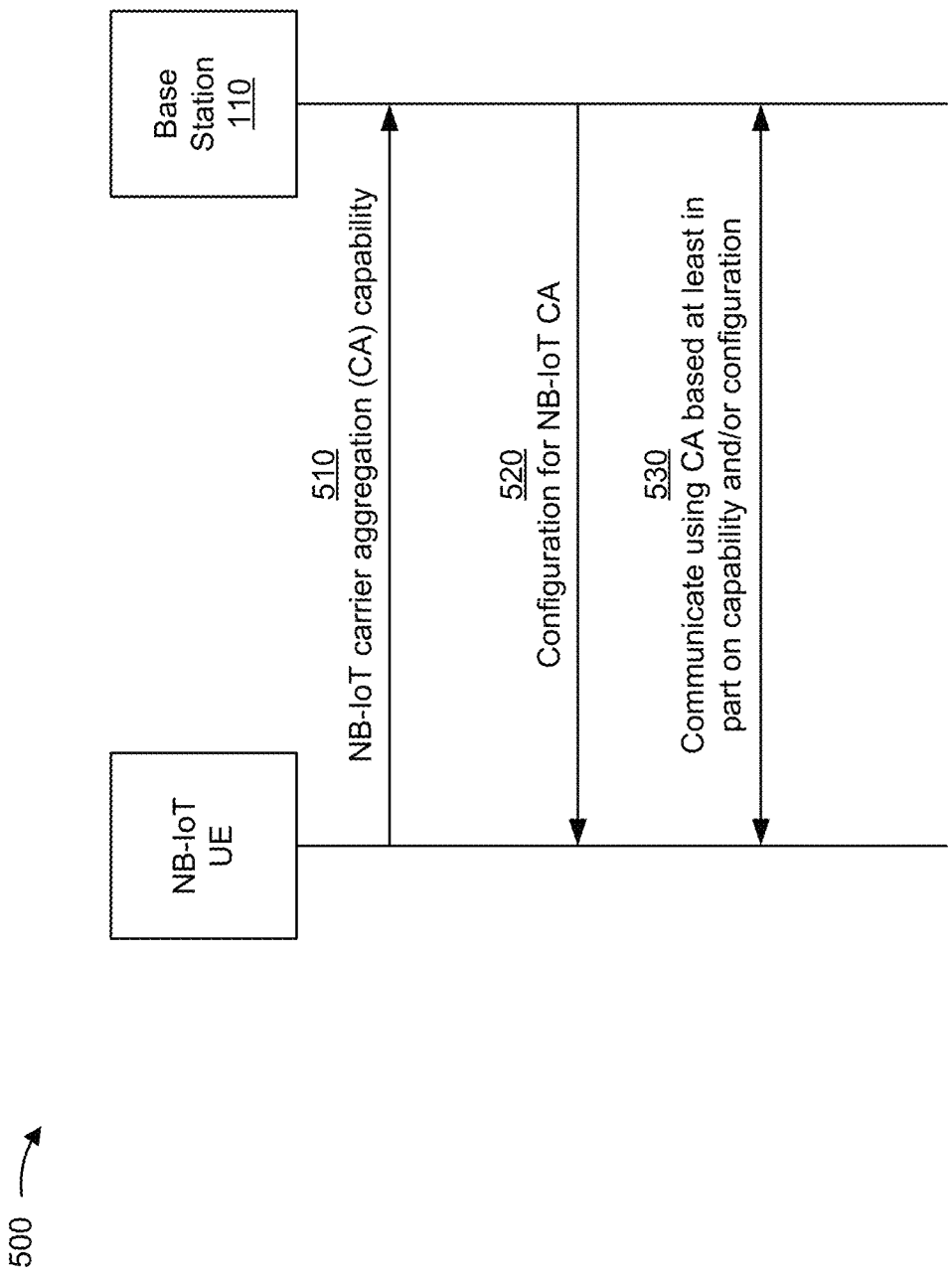
FIGS. 5-9 are diagrams illustrating examples relating to carrier aggregation for an NB-IoT UE, in accordance with various aspects of the present disclosure.

FIG. 5 is a diagram illustrating an example 500 relating to carrier aggregation for an NB-IoT UE, in accordance with various aspects of the present disclosure. As shown in FIG. 5, an NB-IoT UE (e.g., a UE 120) and a base station 110 may communicate with one another.

As shown by reference number 510, the NB-IoT UE may signal, to the base station 110, a capability of the NB-IoT UE relating to carrier aggregation (CA) for NB-IoT UEs (sometimes referred to as an NB-IoT capability). In some aspects, the capability may include a capability of the NB-IoT UE to communicate using an inband NB-IoT carrier, a guardband NB-IoT carrier, a standalone NB-IoT carrier, and/or the like, as described above in connection with FIG. 3. Thus, the capability may indicate whether inband NB-IoT carriers, guardband NB-IoT carriers, and/or standalone NB-IoT carriers can be aggregated for the NB-IoT UE. Additionally, or alternatively, the capability may indicate whether the NB-IoT UE is capable of aggregating only anchor carriers, only non-anchor carriers, or both anchor carriers and non-anchor carriers. Although some techniques are described herein in connection with NB-IoT UEs, these techniques may apply to other categories or classes of UEs, such as reduced capability UEs, low tier UEs, and/or the like.

In some aspects, the capability may indicate a number of NB-IoT carriers that the NB-IoT UE is capable of aggregating (e.g., two carriers, three carriers, and so on). For example, the capability may indicate a total number of carriers that the NB-IoT UE is capable of aggregating, a number of inband NB-IoT carriers that the NB-IoT UE is capable of aggregating, a number of guardband NB-IoT carriers that the NB-IoT UE is capable of aggregating, a number of standalone NB-IoT carriers that the NB-IoT UE is capable of aggregating, a number of anchor carriers that the NB-IoT UE is capable of aggregating, a number of non-anchor carriers that the NB-IoT UE is capable of aggregating, and/or the like. In some aspects, the NB-IoT UE may separately indicate one or more of the above capabilities for uplink communications and for downlink communications. For example, the NB-IoT UE may be capable of aggregating multiple carriers for downlink communications, but may be capable of using only a single carrier for uplink communications.

In some aspects, the capability may indicate a peak data rate and/or modulation and coding scheme (MCS) per band combination and/or per bandwidth class (e.g., for the NPDSCH). For example, for an NB-IoT UE capable of using 16 quadrature amplitude modulation (16 QAM), such a capability may be used by the base station 110 to configure one or more carriers for carrier aggregation. In some aspects, the NB-IoT UE may indicate different peak data rates and/or MCSs per band combination and/or per bandwidth class. For example, the NB-IoT UE may be capable of using a peak of 16 QAM for a component carrier and/or using a peak of quadrature phase shift keying (QPSK) for two component carriers, may be capable of using a peak of 16 QAM for two component carriers, and/or the like. In some case, a capability of the higher peak rate across component carriers is bounded with 16 QAM, which may be indicated by the NB-IoT UE.

As shown by reference number 520, the NB-IoT UE may receive, from the base station 110, a configuration for carrier aggregation for NB-IoT. In some aspects, the base station 110 may determine the configuration based at least in part on the capability of the UE. For example, the base station 110 may determine whether to configure aggregation of inband NB-IoT carriers, guardband NB-IoT carriers, standalone NB-IoT carriers, anchor carriers, and/or non-anchor carriers based at least in part on a capability of the NB-IoT UE to aggregate these types of carriers. Additionally, or alternatively, the base station 110 may determine a total number of carriers to aggregate and/or a number of carriers of different types to aggregate based at least in part on the capability of the NB-IoT UE. In some aspects, the configuration may be transmitted in an RRC message, such as an RRC configuration message, an RRC reconfiguration message, and/or the like.

In some aspects, the configuration may indicate multiple anchor carriers to be aggregated for carrier aggregation. In this case, a first anchor carrier may be used as a primary cell (PCell) and a second anchor carrier may be used as a secondary cell (SCell). In some aspects, the configuration may indicate the first anchor carrier to be used as the PCell and the second anchor carrier to be used as the SCell. In some aspects, the anchor carriers that are aggregated may be associated with and/or configured with the same cell identifier. In some aspects, the anchor carriers that are aggregated may be associated with and/or configured with different cell identifiers. When multiple anchor carriers are aggregated, a limited number of subframes (or other transmission time intervals (TTIs), such as slots, mini-slots, and/or the like) may be aggregated for data and/or control information due to transmission of the PBCH, PSS, SSS, SIB(s), and/or the like on anchor carriers.

In some aspects, the configuration may indicate an anchor carrier and a non-anchor carrier to be aggregated for carrier aggregation. In this case, the anchor carrier may be used as a PCell and the non-anchor carrier may be used as an SCell. In some aspects, the configuration may indicate the anchor carrier to be used as the PCell and the non-anchor carrier to be used as the SCell. When an anchor carrier and a non-anchor carrier are aggregated, the valid subframes (or other TTIs) that can be aggregated for data and/or control information may be different in the anchor carrier as compared to the non-anchor carrier due to transmission of the PBCH, PSS, SSS, SIB(s), and/or the like on anchor carriers. Thus, in some aspects, the configuration may indicate a valid subframe (or TTI) bitmap that indicates subframes that can be aggregated for control and/or data on both the anchor carrier and the non-anchor carrier (e.g., subframes 1, 2, 3, 6, 7, and 8 in FIG. 3). In some aspects, the PDSCH across multiple carriers can only use the common valid subframes of the aggregated anchor carrier and non-anchor carrier(s).

Furthermore, different power boosting (e.g., different transmit powers) may be used for transmissions on an anchor carrier as compared to transmissions on a non-anchor carrier. For example, anchor carrier transmissions may be transmitted with a higher transmit power than non-anchor carrier transmissions to increase the likelihood that anchor carrier transmissions are received due to the information carried on anchor carriers (e.g., PBCH, NPSS, NSSS, SIB (s), and/or the like). Thus, in some aspects, the configuration may indicate a power boosting for the anchor carrier, a power boosting for the non-anchor carrier, and/or the like. In some aspects, the power difference among different carriers is limited. For example, the power difference among different carriers can be limited if the UE uses the same RF to receive the carriers (e.g., the same RF components, the same RF chain, the same RF band, and/or the like). For example, the configuration may indicate a power boosting limitation associated with the anchor carrier and/or the non-anchor carrier. Alternatively, the power boosting limitation may be predefined (e.g., according to a wireless communication standard).

In some aspects, the configuration may indicate multiple non-anchor carriers to be aggregated for carrier aggregation. In this case, a first non-anchor carrier may be used as a PCell and a second non-anchor carrier may be used as an SCell. In some aspects, the configuration may indicate the first non-anchor carrier to be used as the PCell and the second non-anchor carrier to be used as the SCell. In some aspects, when multiple non-anchor carriers are aggregated, the valid subframes (or other TTIs) that can be aggregated for data and/or control information may be the same. Alternatively, the valid subframes that can be aggregated for data and/or control information may be different (e.g., based at least in part on a configuration of the non-anchor carriers). In some aspects, the configuration may indicate a valid subframe (or TTI) bitmap that indicates subframes that can be aggregated for control and/or data on the multiple non-anchor carriers (e.g., the PCell and one or more SCells). In some aspects, the multiple non-anchor carriers may be associated with a same power boost. For example, the same transmit power may be used for transmissions on the multiple non-anchor carriers. Alternatively, the power boosting limitation may be predefined for the aggregated anchor carriers. In some aspects, the same ID may be configured as the cell ID or scrambling sequence ID for the aggregated carriers.

In some aspects, the configuration and/or system information may indicate one or more carriers to be used for paging messages (e.g., when the NB-IoT UE is in an RRC idle mode) and/or single cell point-to-multipoint (SC-PTM) communications. In some aspects, multiple carriers may be configured for paging and/or SC-PTM communications to increase the likelihood of reception by an NB-IoT UE. In some aspects, the base station 110 may determine the number of carriers and/or may identify the carrier(s) to be used for paging and/or SC-PTM based at least in part on a capability of the NB-IoT UE. In some aspects, a non-anchor carrier may be used for paging and/or SC-PTM (e.g., in addition to an anchor carrier). In some aspects, paging messages and/or SC-PTM communications may be repeated and/or transmitted using frequency hopping across multiple carriers to increase frequency diversity. In some aspects, an NPDCCH (e.g., using DCI with format N2 for paging) may be used to indicate NPDSCH paging on multiple carriers.

As shown by reference number 530, the NB-IoT UE may communicate with the base station 110 using carrier aggregation based at least in part on the configuration for carrier aggregation for NB-IoT. In some aspects, when communicating using carrier aggregation, the NB-IoT UE may assume the same quasi co-location (QCL) parameters for all of the aggregated carriers. In some aspects, the NB-IoT UE may use a single baseband processor and/or a single tracking loop for communications on multiple aggregated carriers. In some aspects, the NB-IoT UE may use different baseband processors and/or different tracking loops for communications on different aggregated carriers. As described in more detail below, communicating using carrier aggregation for NB-IoT may include transmitting or receiving an NPDCCH communication, an NPDSCH communication, an NPUSCH communication (e.g., for hybrid automatic repeat request (HARD) acknowledgement (ACK) (HARQ-ACK) feedback, for acknowledgement or negative acknowledgement (ACK/NACK) feedback, and/or the like). By using carrier aggregation for NB-IoT, throughput may be increased for NB-IoT UEs.

In some aspects, the NB-IoT UE and the base station 110 may communicate using NB-IoT carrier aggregation when the NB-IoT UE is in RRC idle mode (e.g., prior to receiving an RRC configuration message). For example, the NB-IoT and the base station 110 may use NB-IoT carrier aggregation during a random access procedure. In some aspects, the NB-IoT UE may use preconfigured uplink resources (PUR) for random access channel (RACH) msg1, and a downlink response in msg2 may use carrier aggregation. Additionally, or alternatively, the NB-IoT UE may use early data transmission (EDT) to transmit data in RACH msg3, and a downlink response in msg4 may use carrier aggregation. In this way, throughput may be increased.

As indicated above, FIG. 5 is provided as an example. Other examples may differ from what is described with regard to FIG. 5.

Figure 6:
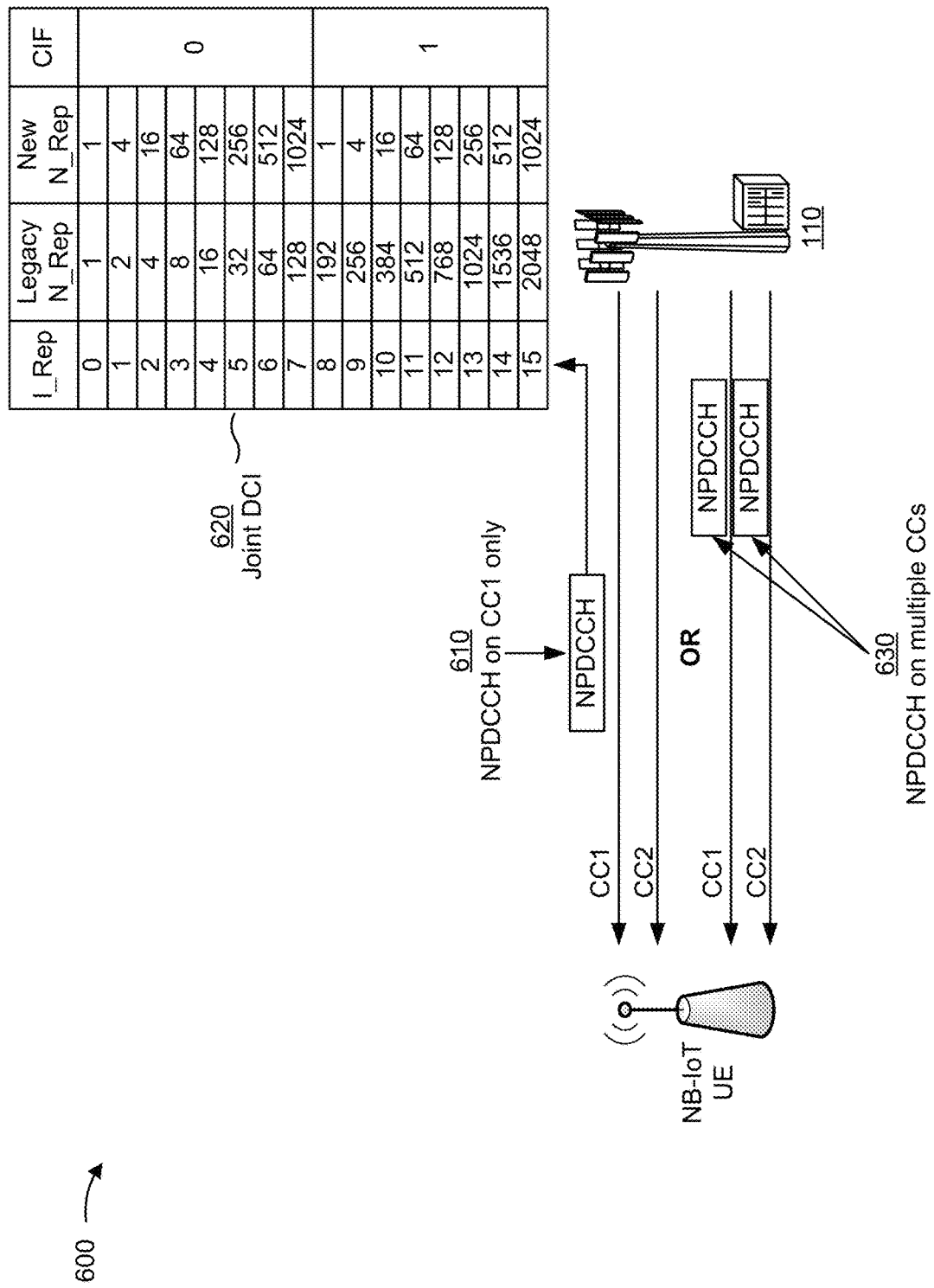

FIG. 6 is a diagram illustrating another example 600 relating to carrier aggregation for an NB-IoT UE, in accordance with various aspects of the present disclosure. As shown in FIG. 6, an NB-IoT UE (e.g., a UE 120) and a base station 110 may communicate with one another.

As shown by reference number 610, in some aspects, the NB-IoT UE and the base station 110 may communicate using a single component carrier for an NPDCCH (e.g., for downlink control information). In this case, the base station 110 may transmit the NPDCCH on a single CC (shown as CC1), and the NB-IoT UE may monitor for the NPDCCH on the single CC. In some aspects, the single CC on which the NPDCCH is carried may be indicated in the configuration described above in connection with FIG. 5. Additionally, or alternatively, the NPDCCH may be carried on the PCell (e.g., by default, unless configured otherwise). In this way, the NB-IoT UE may conserve battery power and other UE resources (e.g., processing resources, memory resources, and/or the like) by monitoring for the NPDCCH only on the single CC.

In some aspects, the single CC may carry DCI for multiple CCs (e.g., all CCs) used for carrier aggregation. This may be referred to as cross-carrier scheduling. In some aspects, as shown by reference number 620, the DCI is joint DCI that includes a field and/or a bit that indicates whether a corresponding configuration is for a PCell or an SCell. For example, the DCI may include an index field (shown as I_Rep) that includes an index value for a number of repetitions, a number of repetitions field (shown as New N_Rep) that indicates a number of repetitions for transmissions for a corresponding index value, and a carrier information field (CIF) that indicates whether the corresponding index value and number of repetitions is for the PCell (e.g., when the CIF field includes a bit set to zero) or for the SCell (e.g., when the CIF field includes a bit set to one). In some aspects, the CCs represented by different values of the CIF field may be indicated in the configuration described above in connection with FIG. 5. In the joint DCI of FIG. 6, the DCI size is kept the same as legacy DCI, and one bit (e.g., a higher information bit (HIB)) is repurposed to indicate a corresponding CC. As shown, the number of repetitions field may include a subset of repetitions indicated in legacy DCI (shown as Legacy N_Rep). Since carrier aggregation is being used, fewer repetitions may be necessary. In some aspects, rather than repurposing a bit in legacy DCI, a new bit may be added to the DCI to indicate the corresponding CC.

In some aspects, the DCI carried by the single CC for multiple CCs may include different DCI for each CC (e.g., for cross-carrier scheduling). In this case, each different DCI may indicate whether a corresponding CC carries data. In some aspects, each CC used for carrier aggregation may carry its own DCI. This may be referred to as non-cross-carrier scheduling. In some aspects, the configuration described above in connection with FIG. 5 may indicate whether each CC carries DCI for that CC (e.g., whether each CC carries its own DCI) or whether a single CC carries DCI for multiple CCs (e.g., all CCs) used for carrier aggregation. In the case where a single CC carries DCI for multiple CCs, the configuration may indicate whether the single CC carries joint DCI for the multiple CCs or separate DCI for each of the multiple CCs.

As shown by reference number 630, in some aspects, the NB-IoT UE and the base station 110 may communicate using multiple component carriers for an NPDCCH (e.g., for downlink control information). In this case, the base station 110 may transmit the NPDCCH on multiple CCs (shown as CC1 and CC2), and the NB-IoT UE may monitor for the NPDCCH on the multiple CCs. The multiple CCs may include all CCs configured for carrier aggregation or a subset of the CCs configured for carrier aggregation. In this way, performance may be improved (e.g., due to increased reliability, diversity gains, and/or the like).

In some aspects, the multiple CCs on which the NPDCCH is carried may be indicated in the configuration described above in connection with FIG. 5. Additionally, or alternatively, the configuration may indicate whether the NPDCCH is carried on a single CC or on multiple CCs. In some aspects, the multiple CCs (e.g., which may be contiguous CCs) that carry the NPDCCH may be associated with the same PCell identifier (PCID). In this way, control channel elements (CCEs) can be distributed in more than one resource block to achieve a coding gain.

In some aspects, the multiple CCs that carry the NPDCCH may be configured with frequency hopping and/or repetition for the NPDCCH. In this case, the configuration may indicate a frequency hopping pattern and/or a repetition pattern. The base station 110 may transmit the NPDCCH on different CCs according to the frequency hopping pattern and/or the repetition pattern. The NB-IoT UE may monitor for the NPDCCH on different CCs according to the frequency hopping pattern and/or the repetition pattern. In this way, performance may be improved via frequency diversity and/or time diversity.

As indicated above, FIG. 6 is provided as an example. Other examples may differ from what is described with regard to FIG. 6.

Figure 7:
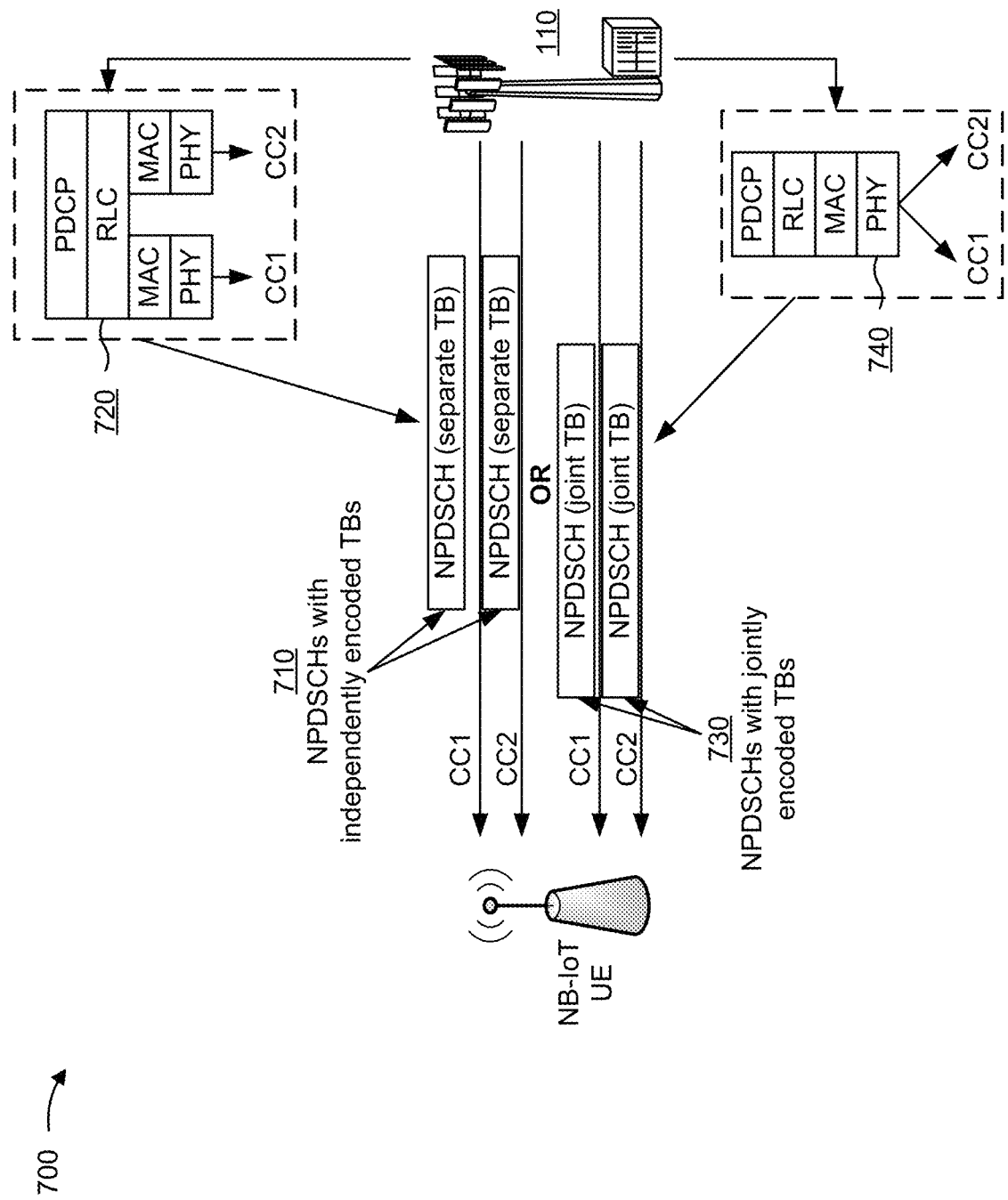

FIG. 7 is a diagram illustrating another example 700 relating to carrier aggregation for an NB-IoT UE, in accordance with various aspects of the present disclosure. As shown in FIG. 7, an NB-IoT UE (e.g., a UE 120) and a base station 110 may communicate with one another.

As shown by reference number 710, in some aspects, the NB-IoT UE and the base station 110 may communicate using independently encoded transport blocks (TBs) on the NPDSCH (e.g., for downlink data). This may be referred to as non-cross-carrier coding. In this case, the base station 110 may transmit the NPDSCH on multiple CCs (shown as CC1 and CC2) using independently encoded TBs on the different CCs, and the NB-IoT UE may independently decode the TBs on the different CCs. For independently encoded TBs, the base station 110 may transmit, and the NB-IoT UE may receive, separate media access control (MAC) packets on the different CCs, as shown by reference number 720. In some aspects, the independently encoded TBs may be scheduled by separate DCI (e.g., having DCI format N1), such as by using one DCI per TB per carrier. Alternatively, the independently encoded TBs may be scheduled using multi-TB DCI to schedule different TBs per CC.

For independently encoded TBs, the NB-IoT UE may transmit separate (e.g., multiple) HARQ-ACK information for each TB per CC. For example, the NB-IoT UE may independently encode and transmit, to the base station 110, separate HARQ-ACK information for each independently encoded TB. In some aspects, the NB-IoT UE may use different (e.g., independent) NPUSCHs to transmit different HARQ-ACK information per carrier. In some aspects, the NB-IoT UE may apply interlacing between different NPUSCHS to improve transmit diversity. In some aspects, the NB-IoT UE may use a joint NPUSCH (e.g., a single NPUSCH) for the separate HARQ-ACK information, such as by using HARQ-ACK bundling.

As shown by reference number 730, in some aspects, the NB-IoT UE and the base station 110 may communicate using jointly encoded TBs on the NPDSCH (e.g., for downlink data). This may be referred to as cross-carrier coding. In this case, the base station 110 may transmit the NPDSCH on multiple CCs (shown as CC1 and CC2) using jointly encoded TBs on the different CCs, and the NB-IoT UE may jointly decode the TBs on the different CCs. In some aspects, the multiple CCs may be contiguous CCs. Additionally, or alternatively, the multiple CCs may have the same PCID. For jointly encoded TBs, the base station 110 may transmit, and the NB-IoT UE may receive, a single MAC packet across the different CCs, as shown by reference number 740. In some aspects, the jointly encoded TBs may be scheduled by a single DCI (e.g., having DCI format N1). For jointly encoded TBs, the TB size may be based at least in part on the number of CCs on which the jointly encoded TB is carried. For example, the TB size may be equal to the number of CCs multiplied by the number of subframes for resource allocation per carrier.

For jointly encoded TBs, the NB-IoT UE may transmit a single HARQ-ACK information for the jointly encoded TBs. For example, the NB-IoT UE may transmit a single HARQ-ACK information for the jointly encoded TBs on an NPUSCH (e.g., a single NPUSCH).

In some aspects, the configuration described above in connection with FIG. 5 may indicate whether different CCs carry independently encoded transport blocks for the NPDSCH or whether different CCs carry a jointly encoded transport block for the NPDSCH. By using carrier aggregation to transmit TBs on multiple CCs, throughput may be increased for NB-IoT UEs.

In some aspects, the configuration may indicate different carrier aggregation configurations for initial transmissions as compared to retransmissions (e.g., initial transmissions and retransmissions of PDSCH communications). For example, a different number of CCs may be used for initial transmissions (e.g., multiple CCs) as compared to retransmissions (e.g., a single CC). In some aspects, if an initial transmission uses independent TBs and independent HARQ processes, then a retransmission may also follow this carrier aggregation configuration. In some aspects, if an initial transmission uses joint TBs, then a retransmission may also use joint TBs. However, in some cases, if an initial transmission uses joint TBs, then a retransmission may also use separate TBs to increase the likelihood of reception.

For legacy NB-IoT UEs, the NB-IoT UE assumes that NRSs are transmitted on the carrier for NPDCCH and NPDSCH. For NB-IoT with carrier aggregation, in some aspects, the NB-IoT UE may determine whether to monitor for NRSs on a carrier and/or a manner in which to monitor for NRSs on the carrier based at least in part on whether the carrier is a PCell or an SCell. For example, the NB-IoT UE may assume that NRSs are transmitted on the PCell (e.g., the monitored carrier with the search space for the NPDCCH). In some aspects, the NB-IoT UE may assume that NRSs are transmitted on the SCell only during an NPDSCH period, which may include an active time period during which the NPDSCH is scheduled and/or transmitted, a warm-up time period that precedes the active time period (e.g., N1 subframes before the active time period, such as N1=1), and/or a cool-down period that follows the active time period (e.g., N2 subframes after the active time period, such as N2=1). In some aspects, if NPDSCH with frequency hopping is configured, NRS may be deactivated for a first carrier when the NB-IoT UE tunes to a second carrier. Additionally, or alternatively, NRS may be activated for the second carrier when the NB-IoT UE tunes to the second carrier. In some aspects, a denser pattern of NRSs (e.g., with rate matching) as compared to legacy NB-IoT may be used for channel estimation warm-up to reduce an amount of time needed to perform channel estimation warm-up.

For legacy NB-IoT UEs, code block segmentation may not be used due to a limit on the maximum TB size (e.g., 2536 bits). However, for NB-IoT with carrier aggregation, a larger TB size may be used. Thus, in some aspects, the base station 110 may transmit and the NB-IoT UE may receive multiple code block segments for a TB. For example, if the TB size is greater than 2536 bits (but less than or equal to 5072 bits), then, in some aspects, 8 or 16 code block cyclic redundancy check (CRC) bits may be used in addition to the TB CRC bits. Alternatively, the TB CRC bits may be used without adding any additional code block CRC bits. Alternatively, 24 code block CRC bits may be used for each code block and the TB CRC bits may be removed.

Alternatively, 8, 16, or 24 code block CRC bits may be used for the first code block and zero CRC bits may be used for the second code block, and the TB CRC bits may be used. In this last case, the NB-IoT UE may detect the two code blocks and may first check the first code block CRC bits. If the first code block CRC passes, then the NB-IoT UE may check the TB CRC bits. If the TB CRC fails, then the NB-IoT may terminate the communication (e.g., using early termination to conserver resources).

As indicated above, FIG. 7 is provided as an example. Other examples may differ from what is described with regard to FIG. 7.

Figure 8:
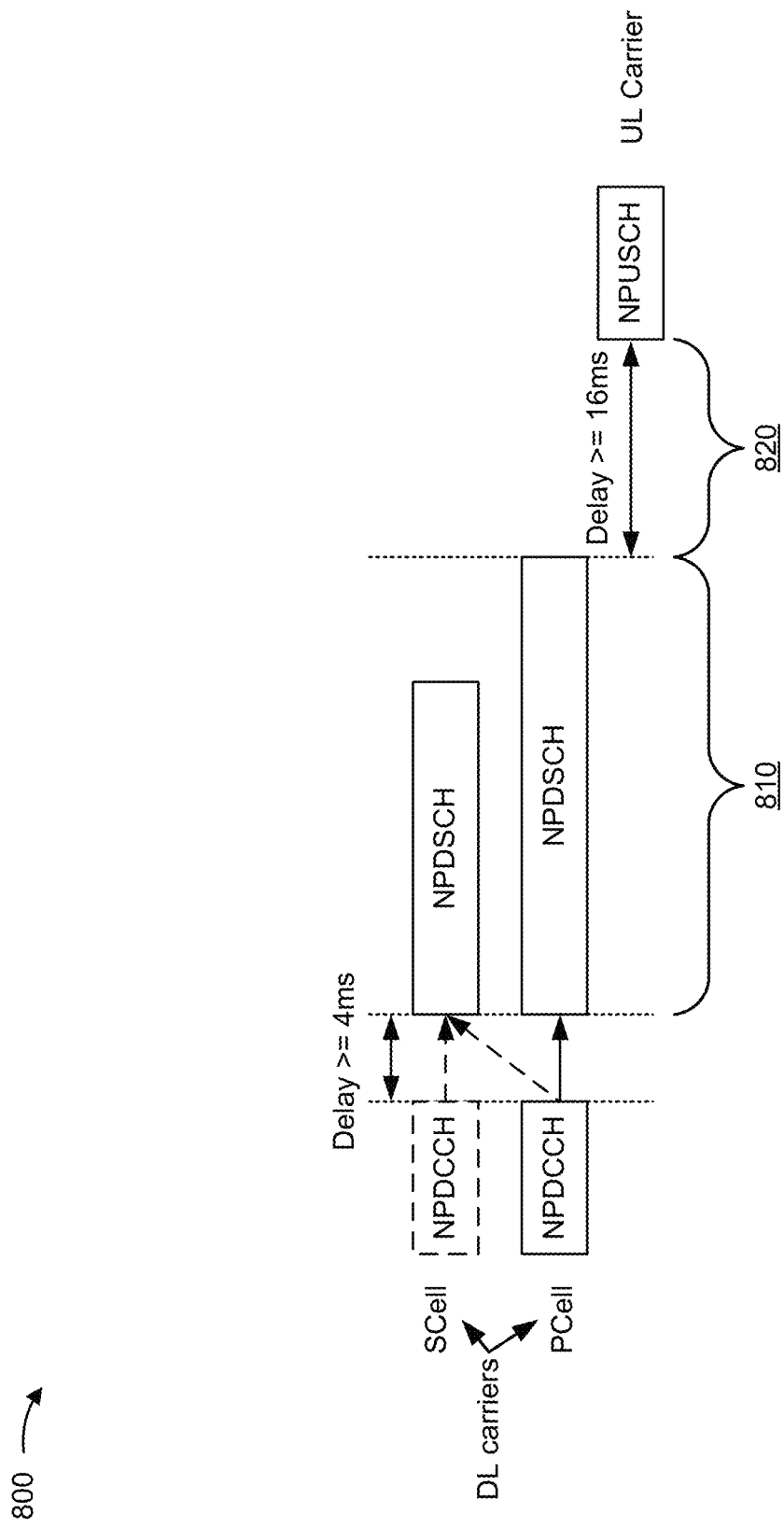

FIG. 8 is a diagram illustrating another example 800 relating to carrier aggregation for an NB-IoT UE, in accordance with various aspects of the present disclosure.

In some aspects, for independently encoded TBs, the NB-IoT UE may transmit separate (e.g., multiple) HARQ-ACK information for each TB in a single NPUSCH, as described above in connection with FIG. 7. As shown by reference number 810, the TBs may be transmitted in NPDSCHs on separate carriers. As further shown, the NPDSCHs on the different carriers may have a different duration and/or may end at a different time (e.g., in a different TTI, such as a different subframe, slot, mini-slot, and/or the like) because of, for example, different sets of valid and invalid subframes on the different carriers. In this case, the timeline for transmitting the NPUSCH may depend on the NPDSCH that ends later (e.g., the end of the NPDSCH with a maximum duration if the NPDSCHs start at the same time). For example, as shown by reference number 820, a timeline of 16 milliseconds (ms) for transmission of the NPUSCH is calculated from the end of the NPDSCH that ends later.

However, in some cases, the NB-IoT UE may not receive DCI for one of the TBs, which may result in a timeline mismatch between when the NB-IoT UE transmits the NPUSCH and when the base station 110 expects to receive the NPUSCH. To resolve this mismatch, the base station 110 may align a duration of the multiple NPDSCHs and/or may schedule the multiple NPDSCHs to end at a same time. Alternatively, the base station 110 may indicate an offset between the end of different NPDSCHs. For example, the base station 110 may indicate, in DCI that schedules an earlier-ending NPDSCH, an offset between an end of the earlier-ending NPDSCH and a later-ending NPDSCH. In this way, if the NB-IoT UE fails to receive the DCI for the later-ending NPDSCH, the NB-IoT UE can still determine the appropriate timeline for transmitting the NPUSCH based at least in part on the end time of the earlier-ending NPDSCH and the offset.

As indicated above, FIG. 8 is provided as an example. Other examples may differ from what is described with regard to FIG. 8.

Figure 9:
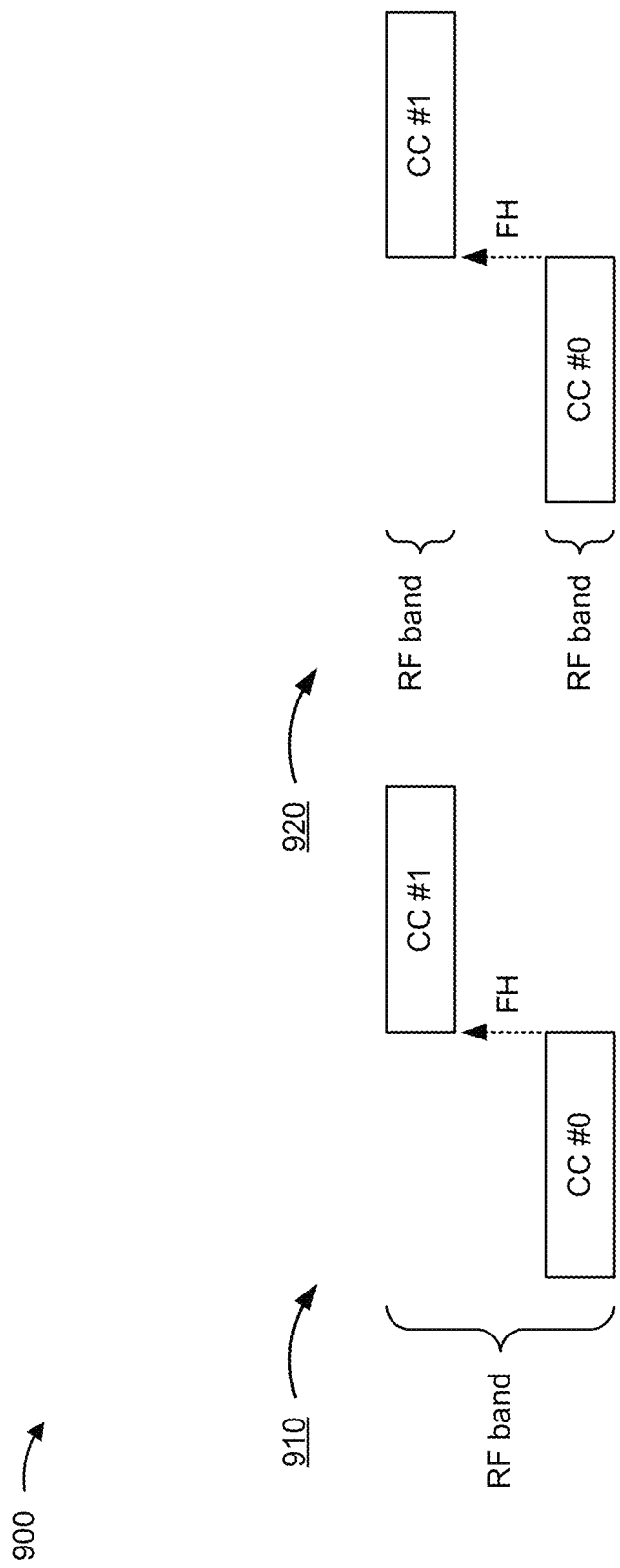

FIG. 9 is a diagram illustrating another example 900 relating to carrier aggregation for an NB-IoT UE, in accordance with various aspects of the present disclosure.

In some aspects, the configuration described above in connection with FIG. 5 may indicate a hopping pattern (e.g., a frequency hopping pattern) for transmissions on different carriers. As shown by reference number 910, in some aspects, intra-band frequency hopping (shown as FH) may be configured, such as when the CCs for carrier aggregation are in the same RF band. As shown by reference number 920, in some aspects, inter-band frequency hopping may be configured, such as when the CCs for carrier aggregation are in different RF bands.

Additionally, or alternatively, the configuration may indicate a bundle size of resource units (e.g., a number of resource units, such as resource blocks, resource elements, TTIs, and/or the like) per hop for the hopping pattern. Additionally, or alternatively, the configuration may indicate a hopping distance between different hops. For example, the configuration may indicate a size of a hop in units of sub-carriers, PRBs, and/or the like. In some aspects, the hopping distance may be predefined (e.g., according to a wireless communication standard). In some aspects, the NB-IoT UE may indicate a capability regarding a retuning time (e.g., in units of symbols, such as 2 symbols). Additionally, or alternatively, the base station 110 may use the capability to schedule transmissions that use frequency hopping. By using frequency hopping, performance may be improved by using frequency diversity.

As indicated above, FIG. 9 is provided as an example. Other examples may differ from what is described with regard to FIG. 9.

Figure 10:
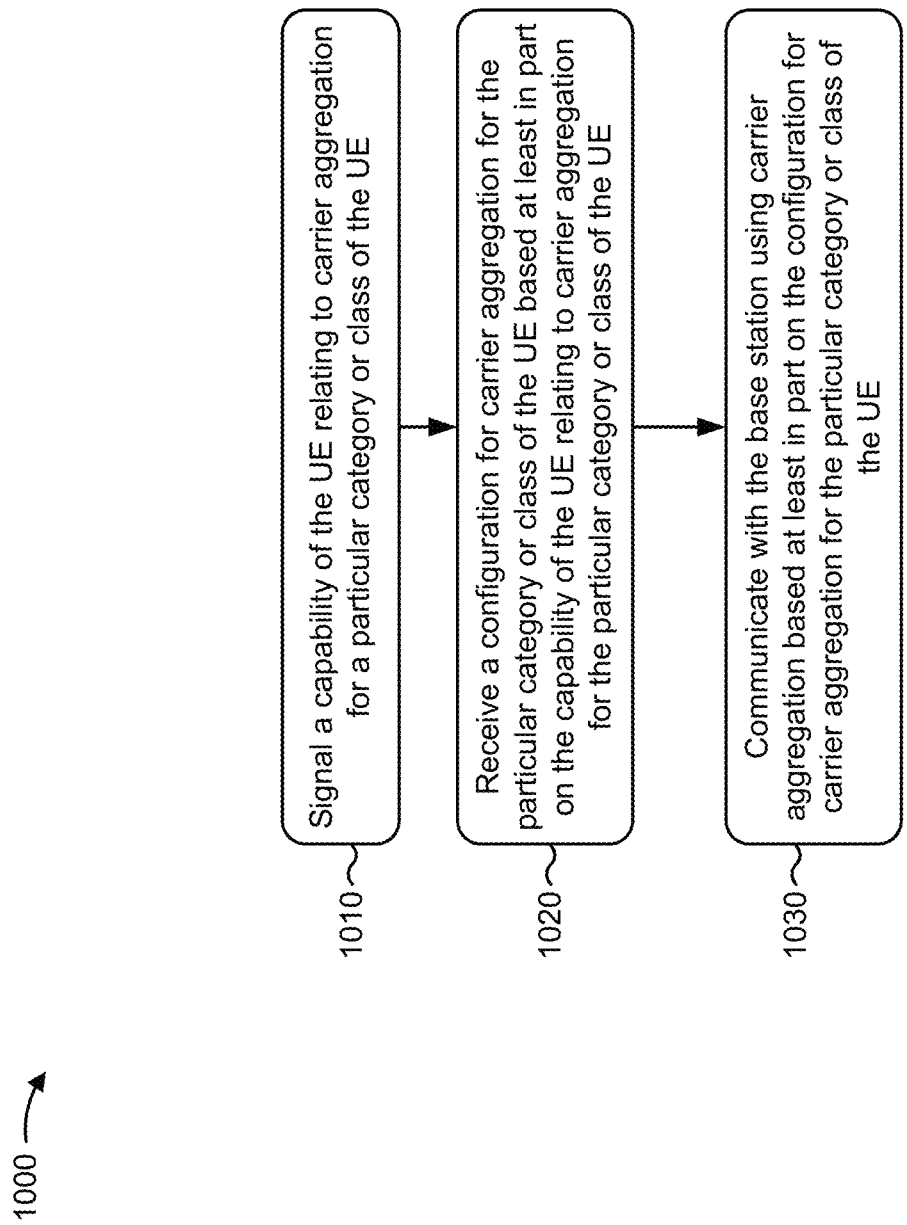

FIG. 10 is a diagram illustrating an example process 1000 performed, for example, by a UE, in accordance with various aspects of the present disclosure. Example process 1000 is an example where a UE (e.g., UE 120, an NB-IoT UE, and/or the like) performs operations associated with carrier aggregation for UEs (e.g., NB-IoT UEs, UEs of a particular category or class, and/or the like).

As shown in FIG. 10, in some aspects, process 1000 may include signaling, to a base station, a capability of the UE relating to carrier aggregation for a particular category or class of the UE (block 1010). For example, the UE (e.g., using transmit processor 264, controller/processor 280, memory 282, and/or the like) may signal, to a base station, a capability of the UE relating to carrier aggregation for a particular category or class of the UE, as described above. In some aspects, the particular category or class of the UE is an NB-IoT category or class, as described above.

As further shown in FIG. 10, in some aspects, process 1000 may include receiving, from the base station, a configuration for carrier aggregation for the particular category or class of the UE based at least in part on the capability of the UE relating to carrier aggregation for the particular category or class of the UE (block 1020). For example, the UE (e.g., using receive processor 258, controller/processor 280, memory 282, and/or the like) may receive, from the base station, a configuration for carrier aggregation for the particular category or class of the UE based at least in part on the capability of the UE relating to carrier aggregation for the particular category or class of the UE, as described above.

As further shown in FIG. 10, in some aspects, process 1000 may include communicating with the base station using carrier aggregation based at least in part on the configuration for carrier aggregation for the particular category or class of the UE (block 1030). For example, the UE (e.g., using receive processor 258, transmit processor 264, controller/processor 280, memory 282, and/or the like) may communicate with the base station using carrier aggregation based at least in part on the configuration for carrier aggregation for the particular category or class of the UE, as described above.

Process 1000 may include additional aspects, such as any single aspect or any combination of aspects described below and/or in connection with one or more other processes described elsewhere herein.

In a first aspect, the capability is a capability of the UE to aggregate at least one of inband carriers (e.g., inband NB-IoT carriers), guardband carriers (e.g., guardband NB-IoT carriers), standalone carriers (e.g., standalone NB-IoT carriers), or a combination thereof.

In a second aspect, alone or in combination with the first aspect, the capability indicates a number of carriers (e.g., NB-IoT carriers) that the UE is capable of aggregating.

In a third aspect, alone or in combination with one or more of the first and second aspects, the configuration indicates multiple anchor carriers to be aggregated for carrier aggregation using a first anchor carrier as a primary cell and a second anchor carrier as a secondary cell.

In a fourth aspect, alone or in combination with one or more of the first through third aspects, the configuration indicates an anchor carrier and a non-anchor carrier to be aggregated for carrier aggregation using the anchor carrier as a primary cell and the non-anchor carrier as a secondary cell.

In a fifth aspect, alone or in combination with one or more of the first through fourth aspects, the configuration indicates at least one of: a valid subframe bitmap for at least one of the primary cell or the secondary cell, a power boosting in a configured or predefined limitation of at least one of the primary cell or the secondary cell, or a combination thereof.

In a sixth aspect, alone or in combination with one or more of the first through fifth aspects, the configuration indicates multiple non-anchor carriers to be aggregated for carrier aggregation using a first non-anchor carrier as a primary cell and a second non-anchor carrier as a secondary cell.

In a seventh aspect, alone or in combination with one or more of the first through sixth aspects, the configuration indicates a valid subframe bitmap for at least one of the primary cell or the secondary cell.

In an eighth aspect, alone or in combination with one or more of the first through seventh aspects, the multiple non-anchor carriers are associated with a same valid subframe bitmap and a same power boost.

In a ninth aspect, alone or in combination with one or more of the first through eighth aspects, communicating with the base station comprises monitoring a single component carrier for a narrowband physical downlink control channel.

In a tenth aspect, alone or in combination with one or more of the first through ninth aspects, the single component carrier is indicated in the configuration.

In an eleventh aspect, alone or in combination with one or more of the first through tenth aspects, communicating with the base station comprises monitoring multiple component carriers for a narrowband physical downlink control channel (NPDCCH).

In a twelfth aspect, alone or in combination with one or more of the first through eleventh aspects, the NPDCCH is monitored using frequency hopping or repetition on the multiple component carriers.

In a thirteenth aspect, alone or in combination with one or more of the first through twelfth aspects, the NPDCCH is mapped across the multiple component carriers, and the multiple component carriers are contiguous and are associated with a same primary cell identifier.

In a fourteenth aspect, alone or in combination with one or more of the first through thirteenth aspects, the configuration indicates whether to use a single component carrier or multiple component carriers for a narrowband physical downlink control channel.

In a fifteenth aspect, alone or in combination with one or more of the first through fourteenth aspects, each component carrier, used for carrier aggregation for the UE, carries downlink control information for that component carrier.

In a sixteenth aspect, alone or in combination with one or more of the first through fifteenth aspects, a single component carrier carries downlink control information (DCI) for multiple component carriers used for carrier aggregation for the UE.

In a seventeenth aspect, alone or in combination with one or more of the first through sixteenth aspects, the DCI is joint DCI that includes a field or a bit that indicates whether a corresponding configuration is for a primary cell or a secondary cell.

In an eighteenth aspect, alone or in combination with one or more of the first through seventeenth aspects, the DCI includes different DCI for each component carrier. In some aspects, each different DCI indicates whether a corresponding component carrier carries data.

In a nineteenth aspect, alone or in combination with one or more of the first through eighteenth aspects, the configuration indicates whether each component carrier carries DCI for that component carrier or whether a single component carrier carries DCI for all component carriers used for carrier aggregation for the UE.

In a twentieth aspect, alone or in combination with one or more of the first through nineteenth aspects, different component carriers, used for carrier aggregation for the UE, carry independently encoded transport blocks.

In a twenty-first aspect, alone or in combination with one or more of the first through twentieth aspects, each hybrid automatic repeat request acknowledgement (HARQ-ACK) information for each independently encoded transport block is transmitted on a different narrowband physical uplink shared channel.

In a twenty-second aspect, alone or in combination with one or more of the first through twenty-first aspects, hybrid automatic repeat request acknowledgement (HARQ-ACK) information for each independently encoded transport block is transmitted on a joint narrowband physical uplink shared channel.

In a twenty-third aspect, alone or in combination with one or more of the first through twenty-second aspects, a set of scheduled narrowband physical downlink shared channels on the different component carriers are scheduled to end at a same time.

In a twenty-fourth aspect, alone or in combination with one or more of the first through twenty-third aspects, an offset between different scheduled narrowband physical downlink shared channels on the different component carriers is indicated to the UE.

In a twenty-fifth aspect, alone or in combination with one or more of the first through twenty-fourth aspects, different component carriers, used for carrier aggregation for the UE, carry a jointly encoded transport block for a narrowband physical downlink shared channel.

In a twenty-sixth aspect, alone or in combination with one or more of the first through twenty-fifth aspects, a single hybrid automatic repeat request acknowledgement (HARQ-ACK) information for the jointly encoded transport block is transmitted on a narrowband physical uplink shared channel.

In a twenty-seventh aspect, alone or in combination with one or more of the first through twenty-sixth aspects, the configuration indicates whether different component carriers, used for carrier aggregation for the UE, carry independently encoded transport blocks or a jointly encoded transport block for a narrowband physical downlink shared channel.

In a twenty-eighth aspect, alone or in combination with one or more of the first through twenty-seventh aspects, the capability indicates a peak data rate per band combination or per bandwidth class.

In a twenty-ninth aspect, alone or in combination with one or more of the first through twenty-eighth aspects, the configuration indicates at least one of a hopping pattern for transmissions on different carriers, a bundle size of resource units per hop for the hopping pattern, a hopping distance between different hops, or a combination thereof.

In a thirtieth aspect, alone or in combination with one or more of the first through twenty-ninth aspects, the UE is configured to monitor for narrowband reference signals on a carrier based at least in part on whether the carrier is a primary cell or a secondary cell.

In a thirty-first aspect, alone or in combination with one or more of the first through thirtieth aspects, communicating with the base station comprises receiving a plurality of code block segments for a transport block.

In a thirty-second aspect, alone or in combination with one or more of the first through thirty-first aspects, the configuration or system information indicates one or more carriers to be used for paging, single cell point-to-multipoint communications, or a combination thereof.

In a thirty-third aspect, alone or in combination with one or more of the first through thirty-second aspects, the particular category or class of the UE is an NB-IoT category or class.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a base station, in accordance with various aspects of the present disclosure. Example process 1100 is an example where a base station (e.g., base station 110 and/or the like) performs operations associated with carrier aggregation for UEs (e.g., NB-IoT UEs, UEs of a particular category or class, and/or the like).

As shown in FIG. 11, in some aspects, process 1100 may include receiving, from a UE, an indication of a capability of the UE relating to carrier aggregation for a particular category or class of the UE (block 1110). For example, the base station (e.g., using receive processor 238, controller/processor 240, memory 242, and/or the like) may receive, from a UE, an indication of a capability of the UE relating to carrier aggregation for a particular category or class of the UE, as described above. In some aspects, the particular category or class of the UE is an NB-IoT category or class, as described above.

As further shown in FIG. 11, in some aspects, process 1100 may include transmitting, to the UE, a configuration for carrier aggregation for the particular category or class of the UE based at least in part on the capability of the UE relating to carrier aggregation for the particular category or class of the UE (block 1120). For example, the base station (e.g., using transmit processor 220, controller/processor 240, memory 242, and/or the like) may transmit, to the UE, a configuration for carrier aggregation for the particular category or class of the UE based at least in part on the capability of the UE relating to carrier aggregation for the particular category or class of the UE, as described above.

As further shown in FIG. 11, in some aspects, process 1100 may include communicating with the UE using carrier aggregation based at least in part on the configuration for carrier aggregation for the particular category or class of the UE (block 1130). For example, the base station (e.g., using transmit processor 220, receive processor 238, controller/processor 240, memory 242, and/or the like) may communicate with the UE using carrier aggregation based at least in part on the configuration for carrier aggregation for the particular category or class of the UE, as described above.

Process 1100 may include additional aspects, such as any single aspect or any combination of aspects described above in connection with process 1000.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   signaling, to a network node, a capability of the UE relating to carrier aggregation for a particular category or a particular class of the UE;
   receiving, from the network node, a configuration indicating a plurality of component carriers, including a first non-anchor carrier and a second non-anchor carrier, to be aggregated for carrier aggregation for the particular category or class of the UE based at least in part on the capability of the UE relating to carrier aggregation for the particular category or class of the UE, wherein the configuration indicates the first non-anchor carrier as a primary cell and the second non-anchor carrier as a secondary cell; and
   communicating with the base station network node using carrier aggregation based at least in part on the configuration.

2. The method of claim 1, wherein the capability is a capability of the UE to aggregate at least one of inband carriers, guardband carriers, standalone carriers, or a combination thereof.

3. The method of claim 1, wherein the capability indicates a number of component carriers that the UE is capable of aggregating.

4. The method of claim 1, wherein the configuration indicates at least one of:
   a valid subframe bitmap for at least one of the primary cell or the secondary cell,
   a power boosting in a configured or predefined limitation of at least one of the primary cell or the secondary cell, or
   a combination thereof.

5. The method of claim 1, wherein the configuration indicates a valid subframe bitmap for at least one of the primary cell or the secondary cell.

6. The method of claim 1, wherein the first non-anchor carrier and the second non-anchor carrier are associated with a same valid subframe bitmap and a same power boost.

7. The method of claim 1, wherein communicating with the network node comprises monitoring the plurality of component carriers for a narrowband physical downlink control channel (NPDCCH).

8. The method of claim 7, wherein the NPDCCH is monitored using frequency hopping or repetition on the plurality of component carriers.

9. The method of claim 7, wherein the NPDCCH is mapped across the plurality of component carriers, and wherein the plurality of component carriers are contiguous and are associated with a same primary cell identifier.

10. The method of claim 1, wherein the configuration indicates to use the plurality of component carriers for a narrowband physical downlink control channel (NPDCCH).

11. The method of claim 1, wherein each component carrier, of the plurality of component carriers, carries downlink control information (DCI) for that component carrier.

12. The method of claim 1, wherein a single component carrier, of the plurality of component carriers, carries downlink control information (DCI) for each of the plurality of component carriers.

13. The method of claim 12, wherein the DCI is joint DCI that includes a field or a bit that indicates whether a corresponding configuration, associated with a particular component carrier of the plurality of component carriers, is for the primary cell or the secondary cell.

14. The method of claim 12, wherein the DCI includes different DCI for each component carrier of the plurality of component carriers, and wherein each different DCI indicates whether a corresponding component carrier carries data.

15. The method of claim 1, wherein the configuration indicates whether each component carrier, of the plurality of component carriers, carries downlink control information (DCI) for that component carrier or whether a single component carrier, of the plurality of component carriers, carries DCI for all component carriers used for carrier aggregation for the UE.

16. The method of claim 1, wherein different component carriers, of the plurality of component carriers, carry independently encoded transport blocks.

17. The method of claim 16, wherein a hybrid automatic repeat request acknowledgement (HARQ-ACK) information for each independently encoded transport block is transmitted on a different narrowband physical uplink shared channel.

18. The method of claim 16, wherein hybrid automatic repeat request acknowledgement (HARQ-ACK) information for each independently encoded transport block is transmitted on a joint narrowband physical uplink shared channel.

19. The method of claim 16, wherein a set of scheduled narrowband physical downlink shared channels on the different component carriers are scheduled to end at a same time.

20. The method of claim 16, wherein an offset between different scheduled narrowband physical downlink shared channels on the different component carriers is indicated to the UE.

21. The method of claim 1, wherein different component carriers, of the plurality of component carriers, carry a jointly encoded transport block for a narrowband physical downlink shared channel.

22. The method of claim 21, wherein a single hybrid automatic repeat request acknowledgement (HARQ-ACK) information for the jointly encoded transport block is transmitted on a narrowband physical uplink shared channel.

23. The method of claim 1, wherein the configuration indicates whether different component carriers, of the plurality of component carriers, carry independently encoded transport blocks or a jointly encoded transport block for a narrowband physical downlink shared channel.

24. The method of claim 1, wherein the capability indicates a peak data rate per band combination or a peak data rate per bandwidth class.

25. The method of claim 1, wherein the configuration indicates at least one of a hopping pattern for transmissions on different component carriers of the plurality of component carriers, a bundle size of resource units per hop for the hopping pattern, a hopping distance between different hops, or a combination thereof.

26. The method of claim 1, wherein the UE is configured to monitor for narrowband reference signals on a component carrier, of the plurality of component carriers, based at least in part on whether the component carrier is the primary cell or the secondary cell.

27. The method of claim 1, wherein communicating with the network node comprises receiving a plurality of code block segments for a transport block.

28. The method of claim 1, wherein the configuration or system information indicates one or more component carriers, of the plurality of component carriers, to be used for paging, single cell point-to-multipoint communications, or a combination thereof.

29. The method of claim 1, wherein the particular category or class of the UE is a narrowband Internet of Things category or a narrowband Internet of Things class.

30. A user equipment (UE) for wireless communication, comprising:
a memory; and
one or more processors coupled to the memory, the one or more processors configured to cause the UE to:
signal, to a network node, a capability of the UE relating to carrier aggregation for a particular category or a particular class of the UE;
receive, from the network node, a configuration indicating a plurality of component carriers, including a first non-anchor carrier and a second non-anchor carrier, to be aggregated for carrier aggregation for the particular category or class of the UE based at least in part on the capability of the UE relating to carrier aggregation for the particular category or class of the UE, wherein the configuration indicates the first non-anchor carrier as a primary cell and the second non-anchor carrier as a secondary cell; and
communicate with the network node using carrier aggregation based at least in part on the configuration for carrier aggregation.

31. The UE of claim 30, wherein the capability is a capability of the UE to aggregate at least one of inband carriers, guardband carriers, standalone carriers, or a combination thereof.

32. The UE of claim 30, wherein the capability indicates a number of component carriers that the UE is capable of aggregating.

33. The UE of claim 30, wherein the configuration indicates at least one of:
a valid subframe bitmap for at least one of the primary cell or the secondary cell,
a power boosting in a configured or predefined limitation of at least one of the primary cell or the secondary cell, or
a combination thereof.

34. A method of wireless communication performed by a network node, comprising:
receiving, from a user equipment (UE), an indication of a capability of the UE relating to carrier aggregation for a particular category or a particular class of the UE;
transmitting, to the UE, a configuration indicating a plurality of component carriers, including multiple non anchor carriers a first non-anchor carrier and a second non-anchor carrier, to be aggregated for carrier aggregation for the particular category or class of the UE based at least in part on the capability of the UE relating to carrier aggregation for the particular category or class of the UE, wherein the configuration indicates the first non-anchor carrier as a primary cell and the second non-anchor carrier as a secondary cell; and
communicating with the UE using carrier aggregation based at least in part on the configuration.

35. The method of claim 34, wherein the capability is a capability of the UE to aggregate at least one of inband carriers, guardband carriers, standalone carriers, or a combination thereof.

36. The method of claim 34, wherein the capability indicates a number of component carriers that the UE is capable of aggregating.

37. A network node for wireless communication, comprising:
a memory; and
one or more processors coupled to the memory, the one or more processors configured to cause the network node to:
receive, from a user equipment (UE), an indication of a capability of the UE relating to carrier aggregation for a particular category or a particular class of the UE;
transmit, to the UE, a configuration indicating a plurality of component carriers, including a first non-anchor carrier and a second non-anchor carrier, to be aggregated for carrier aggregation for the particular category or class of the UE based at least in part on the capability of the UE relating to carrier aggregation for the particular category or class of the UE, wherein the configuration indicates the first non-anchor carrier as a primary cell and the second non-anchor carrier as a secondary cell; and
communicate with the UE using carrier aggregation based at least in part on the configuration.

38. The network node of claim 37, wherein the capability is a capability of the UE to aggregate at least one of inband carriers, guardband carriers, standalone carriers, or a combination thereof.

39. The network node of claim 37, wherein the capability indicates a number of component carriers that the UE is capable of aggregating.

40. The network node of claim 37, wherein the configuration indicates at least one of:
a valid subframe bitmap for at least one of the primary cell or the secondary cell,
a power boosting in a configured or predefined limitation of at least one of the primary cell or the secondary cell, or
a combination thereof.

* * * * *